(12) United States Patent
Malik

(10) Patent No.: US 6,654,453 B1
(45) Date of Patent: Nov. 25, 2003

(54) METHOD AND SYSTEM FOR MINIMIZING DATABASE STRUCTURE OVERHEAD IN HANDLING LARGE VOLUME ADVANCED INTELLIGENT NETWORK SERVICES

(75) Inventor: Dale W. Malik, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/205,544

(22) Filed: Dec. 3, 1998

(51) Int. Cl.[7] ............................................... H04M 3/42
(52) U.S. Cl. ........................ 379/201.01; 379/201.02; 379/201.03; 379/201.05; 379/207.02; 379/207.11; 379/230; 379/221.08
(58) Field of Search .................. 379/101.01, 201.01, 379/207.02, 211.01, 212, 269, 207.11, 221.08, 230; 707/104.1

(56) References Cited

U.S. PATENT DOCUMENTS

| | | | | |
|---|---|---|---|---|
| 5,329,578 A | * | 7/1994 | Brennan et al. | 379/211.03 |
| 5,430,719 A | | 7/1995 | Weisser, Jr. | |
| 5,673,299 A | * | 9/1997 | Fuller et al. | 379/201 |
| 5,943,397 A | * | 8/1999 | Gabin et al. | 379/67.1 |
| 5,987,452 A | * | 11/1999 | Kung | 707/4 |
| 6,275,872 B1 | * | 8/2001 | Koch et al. | 710/5 |
| 6,324,273 B1 | * | 11/2001 | Alcott | 379/201.01 |

OTHER PUBLICATIONS

Newton, Newton's Telecom Dictionary, 14th Edition, p. 36, Mar. 1998.*
LASS : Putting the telephone customer in charge, May 1985, pp. 12–17.*

* cited by examiner

Primary Examiner—Ahmad F. Matar
Assistant Examiner—Bing Bui
(74) Attorney, Agent, or Firm—Nora M. Tocups

(57) ABSTRACT

A method and system for minimizing database overhead associated with AIN services includes a cascaded database structure having at least two databases. The first database is a seed database containing basic information about the subscriber and his available services. The second database is a real-time database containing additional information that will be used by the appropriate service application. When the subscriber initially requests the service, the service management system creates an entry in the seed database for the subscriber. The entry contains an identifier for the subscriber and an identifier for the service. Until the subscriber actually uses the service, the seed database remains the only entry for the subscriber. When the subscriber actually uses the service, the service application reads the seed database to determine the privileges for the subscriber and creates a larger entry in the real-time database. The service application may not write to the seed database. When the subscriber cancels the service, both the seed database entry and the real-time database entry are removed.

23 Claims, 4 Drawing Sheets

METHOD AND SYSTEM FOR MINIMIZING DATABASE STRUCTURE OVERHEAD IN HANDLING LARGE VOLUME ADVANCED INTELLIGENT NETWORK SERVICES

BACKGROUND OF THE INVENTION

1. Field of the Invention

The invention is directed to telecommunications services and, more particularly, to a method for minimizing the database structure overhead associated with providing advanced intelligent network services.

2. Background

The Intelligent Network ("IN") is a digital telecommunications network where all of the elements are arranged into a unified, programmable system. A network of computers are run alongside the core telecommunications elements—the switching and transmission equipment—to control all the activities that take place. The system is not required to know about the intricacies of the network elements but instead instructs them through a standard language.

The development of the Signaling System #7 ("SS7") network and the 800 free dialing service led to the IN. The SS7 network is a hierarchy consisting of five elements: (1) Service Control Points ("SCPs"); (2) Service Circuit Nodes ("SCNs"); (3) Service Switching Points ("SSPs"); (4) Signal Transfer Points ("STPs"); and (5) Service Management Systems ("SMSs").

SS7 messages originate in an SSP. The SSP function is found most often in the end-office telephone switch. Commonly found as an adjunct processor, the SSP originates SS7 messages after determining which interoffice trunk will be used to connect a call. The SS7 message is sent to the end office on the remote end of the circuit and contains a request for connection. The SSP also originates an SS7 message when it cannot determine which interoffice circuit to use to connect a call. For example, in the case of an 800 number, the end office cannot determine which circuit to use because it cannot determine how to route the call based on the digits dialed. The 800 number must be converted to a routing number before the switch knows which trunks to use.

The SSP originates a query to an SS7 node which will provide a connection to a database. One of the unique aspects about SS7 networks and databases is that the SSP does not have to know the address of the database. The message originated must only provide the digits dialed. The STP, which is responsible, for routing SS7 messages through the network can use this information to determine which database the query should be sent to.

The STP is responsible for routing traffic through the network. It is not the originator of any traffic and is never the final recipient of any traffic. It is an intermediate point which provides some processing and routing of SS7 messages. When a query is made to a database, the SSP does not typically know the address of the specific database it needs to query. This is desirable because of network management considerations. If the database were to be addressed directly, and the database were unavailable, for any reason, there would be unnecessary delay in trying to determine how to best handle the query. The STP provides Global Title Translation ("GTT") to determine where a query should be routed. The STP examines the Signaling Connection Control Part ("SCCP") to determine what digits were dialed and makes its routing decision based on these global title digits.

The SCP is a front end to subsystems. The SCP is not a database itself, although it may be collocated with one or more database. The SCP function manages access to the various databases and can manage more than one subsystem. The database itself does not have an SS7 address. Queries must be sent to the address of the SCP. The SCP then routes queries to the appropriate subsystem based on the subsystem number.

The SCN is a smart termination connected to ISDN lines that users dial up for special services. The SMS is an AIN operations system designed to manage software updates, service data updates, subscriber data updates, and subscriber service reports.

AIN adds features to IN elements. For instance, AIN SSPs have an arrangement of "triggers" by which queries are initiated. AIN triggers are intended to provide a service-independent way of launching queries to an SCP. With AIN, the central office is not required to know about SCP-based services. It merely responds to a trigger by launching a query onto the SS7 network.

AIN also allows service packages to be installed on SCPs. Service packages are telecommunication services that subscribers may order on demand by, for example, dialing an SCN. Examples of service packages include Caller ID Deluxe where subscribers may see the name and number of the person calling the subscriber, Personal Number Calling Service where callers with priority may be given a "hot code" to access the subscriber, and Personal Number Administration where a subscriber may have calls routed to various locations throughout the day. Service packages rely heavily upon the use of the SCP and its associated databases in routing calls.

To provide the proper level of complexity for a subscriber, most AIN services require one or more relational database entries for that subscriber. For instance, subscribing to the Personal Number Administration service causes the SMS or other network administration element to create a new entry in an SCP database containing the preferred routing pattern for the subscriber. Similarly, the network must store the "hot code" for each Personal Number Calling Service subscriber in an SCP database.

Each database entry has an associated cost to the service provider due to the limit imposed by the database software system. Certain database systems, for example, limit the number of total entries to 200,000. Other systems impose stricter limitations upon the number of entries. In addition, the service provider is hampered by memory and processor limitations. Thus, as the volume of subscribers increases, the service provider must purchase additional database software and equipment.

Many service subscribers, however, never use the selected service. Nevertheless, an entry in a relational database must be created for each subscriber. Moreover, relational databases often include "related" fields, so several fields must be opened for each entry. Since an entry must be created for that subscriber regardless of her use of the service, this can lead to great inefficiencies in database use. For example, a service used by only 20% of its subscribers will waste 80% of that service's database space. While the service provider may incorporate the cost of database storage in the rental price for that service, the database inefficiencies remain.

SUMMARY OF THE INVENTION

This invention minimizes the database inefficiency associated with the provision of large volume AIN services by creating a cascaded database structure that uses limited database space until the subscriber commits to using the service. When the subscriber signs up for a service, an entry is created in a seed database coupled to the SCP. The seed database entry remains the only service-related record for the subscriber. When the subscriber desires to use the service, the application creates a larger entry in a real-time database. When the subscriber suspends the service, the entry in the real-time database is removed.

Advantageously, by this invention, the service provider is not required to store large entries in a single database for each subscriber. Instead, the service provider need only create small entries for subscribers within the seed database. If only a few subscribers use the service, only those subscribers will later have larger entries in the real-time database. The remaining subscribers will remain as "seeds" in the seed database. Thus, the service provider can minimize the database inefficiency associated with large volume telecommunications services. Also, the real-time database may be written to and read from on a real-time basis. Thus, the subscriber may use the service immediately after requesting such use.

More particularly, when a subscriber signs up for a telecommunications service, the service provider's management system creates a record for the subscriber in a seed database. Preferably, the seed database is coupled to a service control point within the service provider's network. The database may only be written to by the management system or other appropriate billing or management system. The application used to implement the service may not write to the seed database. The application may only read from this database.

The seed database record preferably includes at least two fields. The first field identifies the subscriber. The subscriber may be identified by name or directory number. The second field identifies the services that the subscriber has requested. Each service may be identified by a unique service identifier code or by name. Multiple services may be included in a single seed database. The small records stored by the seed database are not large enough to overwhelm the system when the service attracts a large volume of subscribers. Moreover, the small size keeps overhead costs down. Specifically, the service provider is not required to maintain large database entries for subscribers who never use the service.

When a subscriber actually uses the service, he may dial into a service circuit node by, for example, entering a feature access code that routes the call to the SCN. The SCN may play a message and retrieve information from the subscriber about the service. This information is transmitted to the service application residing in the SCP. The service application then accesses a real-time database. If an entry for the subscriber is not found in the real-time database, the application checks the seed database for the entry. When the subscriber's seed database entry is located, the application creates a larger entry in the real-time database. Thus, subsequent uses of the service will cause the application go to immediately find the larger real-time database entry.

The real-time database allows the application to create entries on-the-fly. Unlike current databases that reside within the application, the real-time database is a standalone database separate from the application. In most standard databases, the application cannot create entries on-the-fly. With a stand-alone database, the application may create, update, and remove records when a subscriber begins using the service. Thus, the system is more flexible than standard databases.

When the subscriber desires to return the service to an idle state, he may similarly dial a feature access code which routes the call to the SCN. The SCN collects the appropriate digits and forwards this information to the service application. The service application then deletes the subscriber's name from the real-time database. This frees up resources for additional subscribers to use the service.

In accordance with the purpose of the invention, as embodied and broadly described herein, the invention is a system for using databases in providing a telecommunications service to a subscriber in an intelligent network. The system includes a seed database storing information regarding availability of the service to the subscriber; a real-time application database storing information for use in providing the service to the subscriber; and a service application, resident on at least one computer in the network, that creates entries in the real-time application database upon use of the service by the subscriber.

In further accordance with the purpose of this invention, as embodied and broadly described herein, the invention is a method for using databases in providing telecommunications services to a subscriber. The method includes the steps of receiving a request for the service from the subscriber; in response to the request, storing information regarding the subscriber and the service in a seed database; receiving a request to use the service from the subscriber; in response to the request to use the service, accessing the seed database to determine the availability of the service to the subscriber; and storing information for use in providing the service to the subscriber in a real-time database.

Accordingly, it is an object of this invention to provide a system and method for minimizing database inefficiency in providing telecommunications services in an Advanced Intelligent Network to large volumes of subscribers.

It is an additional object of this invention to reduce the costs associated with providing AIN services to subscribers.

It is yet another object of this invention to provide a system for minimizing database inefficiency in providing AIN services that reduces database memory usage for subscribers that do not use the service.

It is a further object of this invention to provide an efficient AIN database structure that is not complex.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION

This invention is directed to a system and method for minimizing database use in an advanced intelligent network ("AIN") so that these databases may be used more efficiently in providing AIN services. Additional databases are used in conjunction with real-time stand-alone application databases to distinguish between active services being used by a subscriber and dormant services not in use by the subscriber. Specifically, read-only seed databases store small entries regarding dormant services ordered by a subscriber. When the subscriber desires to activate the service, the application creates a larger entry in a real-time stand-alone database. The application utilizes the real-time database to perform the requested service.

Reference will now be made in detail to this invention, examples of which are illustrated in the accompanying drawings. Wherever possible, the same reference numbers will be used throughout the drawings to refer to the same or like parts.

Figure 1:
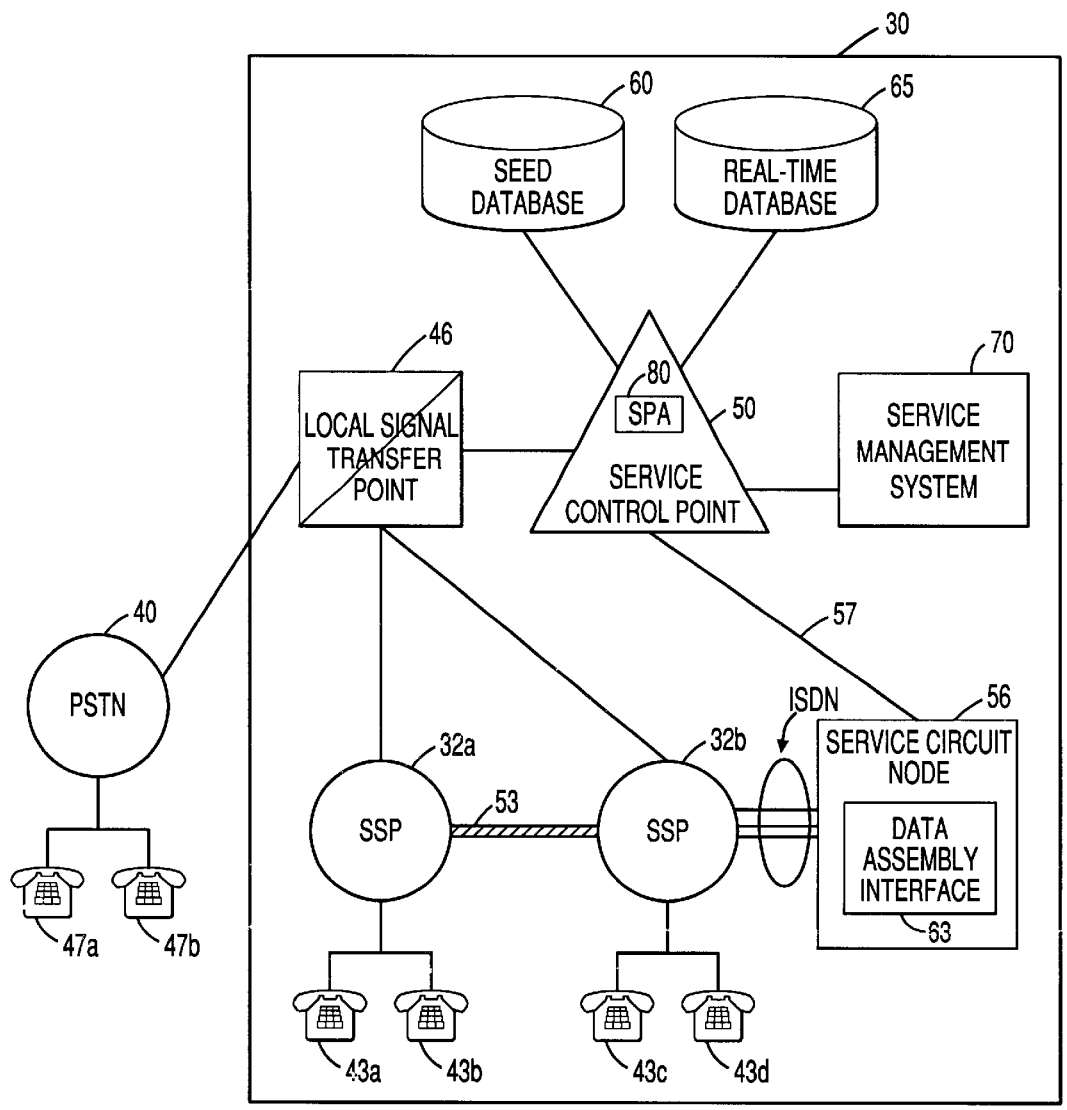
FIG. 1 is a block diagram of an exemplary telecommunications network, according to this invention.

FIG. 1 is a block diagram of an exemplary telecommunications network 30, according to this invention. The network 30 is coupled to a public switched telephone network 40. The PSTN 40 is coupled to a plurality of telephones, including telephones 47a, 47b. The network 30 includes several Advanced Intelligent Network ("AIN") elements. For brevity, only a basic explanation of AIN is provided herein. Where the network 30 operates or is composed differently in an important aspect from that which would be understood by those skilled in the art, additional details are provided herein. For further information regarding AIN technology and aspects thereof, the interested reader is referred to U.S. Pat. No. 5,430,719, to Weisser, which is incorporated herein by reference.

The network 30 includes a variety of interconnected network elements. A group of such network elements includes the plurality of end offices which are indicated as service switching points ("SSPs" or "switches") 32a, 32b in FIG. 1. An SSP typically includes switch functionality, but also includes other functionality so as to communicate with other AIN elements as those skilled in the art understand. As further illustrated in FIG. 1, the SSPs 32a, 32b are coupled to a plurality of subscriber lines. A subscriber line may also be referred to as a calling line. Each SSP 32a, 32b serves a designated group of calling lines, and thus, the SSP that serves a particular calling line may be referred to as its serving switch. Each calling line is connected typically to a piece of terminating equipment including a plurality of telephones 43a–43d. Although telephones are illustrated as the terminating equipment in FIG. 1, those skilled in the art will understand that such terminating equipment may include other telecommunication devices including, but not limited to, facsimile machines, computers, modems, etc. End offices may further be coupled through a tandem office. The tandem office is used to connect and switch circuits between and among other end offices.

Each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number.

SSPs 32a, 32b are interconnected by a plurality of trunk circuits 53. These are the voice path trunks that interconnect the SSPs to connect communications. Each of the SSPs 32a, 32b is connected to another type of AIN element referred to as a local signal transfer point 46 via respective data links. Currently, these are data links employing a signaling protocol referred to as Signaling System #7 ("SS7"), which is well known to those skilled in the art. Much of the intelligence of the AIN resides in yet another type of AIN element referred to as a service control point ("SCP") 50 that is connected to STP 46 over an SS7 data link. Among the functions performed by the SCP 50 is the maintenance of network databases and subscriber databases. These databases may be used in providing temporary advanced telecommunication services to a customer. Typically, the SCP 50 is also the repository of service package applications ("SPAs") 80 that are used in connection with or as part of the databases in the application of telecommunication services or enhanced features to calling lines. The SCP 50 is connected via a data link to a service management system ("SMS") 70. The SMS 70 interfaces to business offices of the local exchange carrier and interexchange carrier.

As illustrated in FIG. 1, the network 30 also includes a service circuit node 56 ("SCN"). SCN 56 includes voice and dual tone multi-frequency ("DTMF") signal recognition devices and voice synthesis devices. In addition, SCN 56 may include a data assembly interface 63 for use in connection with this invention. SCN 56 is connected to the local SCP 50 via data link 57 using an X.25 protocol. In addition, SCN 56 typically is connected to one or more SSPs via Integrated Service Digital Network ("ISDMN") links.

For each service available to a subscriber, this invention uses at least two databases: (1) A seed database 60; and (2) a real-time application database 65. The seed database 60 is a relational database management system that stores information regarding subscribers and their selection of particular services. The SMS 70 creates entries in the seed database 60 when a subscriber selects a service. Until the subscriber uses the service, the small seed database entry remains the only database entry for the subscriber. The SPA 80 may not write to the seed database 60, but instead only reads it to determine the availability of a service for a particular subscriber. The seed database 60 acts as an authorization list for subscribers. The seed database 60 may be constructed using standard database software tools.

The real-time application database 65 is a relational database management application that resides on an SCP or a service node. The database 65 is a stand-alone database external to the application and may be read or written to by the application. The SPA 80 uses the application database 65 in performing the desired service. For example, flexible call forwarding ("FCF") allows a called party/subscriber to request that all calls be sent to a location other than the subscriber's home. The real-time database would be used to store information that is useful or necessary in implementing the FCF service.

The SPA 80 may read and write to the real-time application database 65 on a real-time basis. Thus, when the SPA 80 initially determines that a service is available to a subscriber, the SPA 80 may create the appropriate entries for the subscriber in real time. Similarly, when the SPA 80 determines that a service is no longer available to a subscriber, the SPA 80 may erase entries in the real-time application database 65 for the subscriber.

Figure 2:
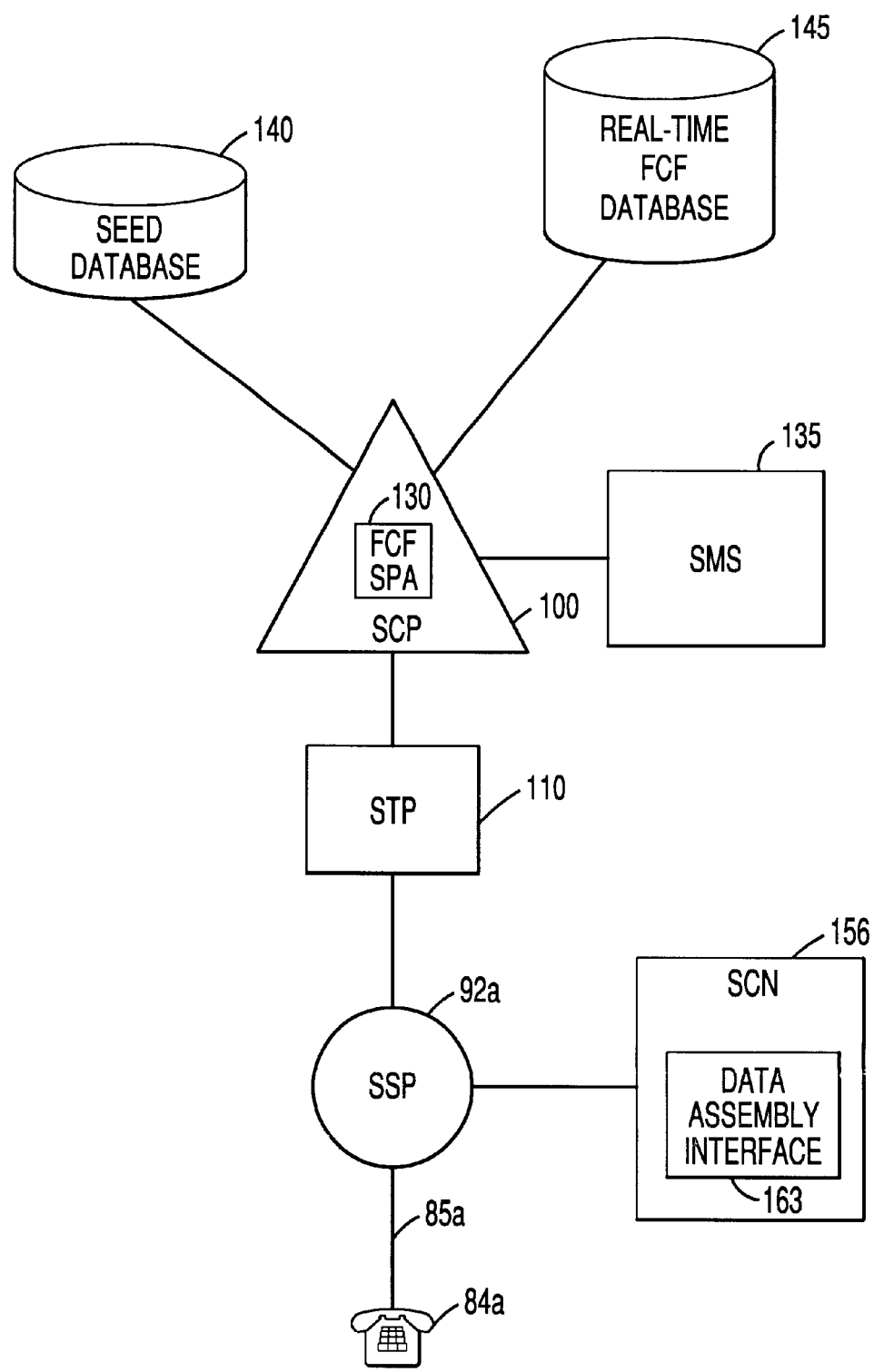
FIG. 2 is a block diagram of an exemplary embodiment operating in exemplary environment according to this invention.

With continuing reference to FIG. 1 and now turning to FIG. 2, the exemplary operation of the present invention is described in the context of a subscriber/calling party subscribing to and using the FCF service and requesting that all calls be sent to a location other than the subscriber's home. It will be appreciated by one skilled in the art that the present invention is not limited to the use of FCF, but may also include other enhanced communication services, including, but not limited to, voice mail, call waiting, call conferencing, and so forth.

In this example, a subscriber having a calling party number (e.g., 770-555-1234) uses his telephone 84a, which is connected by calling line 85a to SSP 92a The SSP 92a is coupled (by one or more signal transfer points (STP) 110) to an SCP 100. The SCP 100 stores an FCF SPA 130. The FCF SPA 130 includes instructions for performing the FCF service, including the accessing of the seed database 140, and the real-time FCF database 145. The subscriber places a call to order the FCF service from a customer service representative at a customer service office of the service provider. Any known method for requesting a service may be used in this invention.

Figure 3:
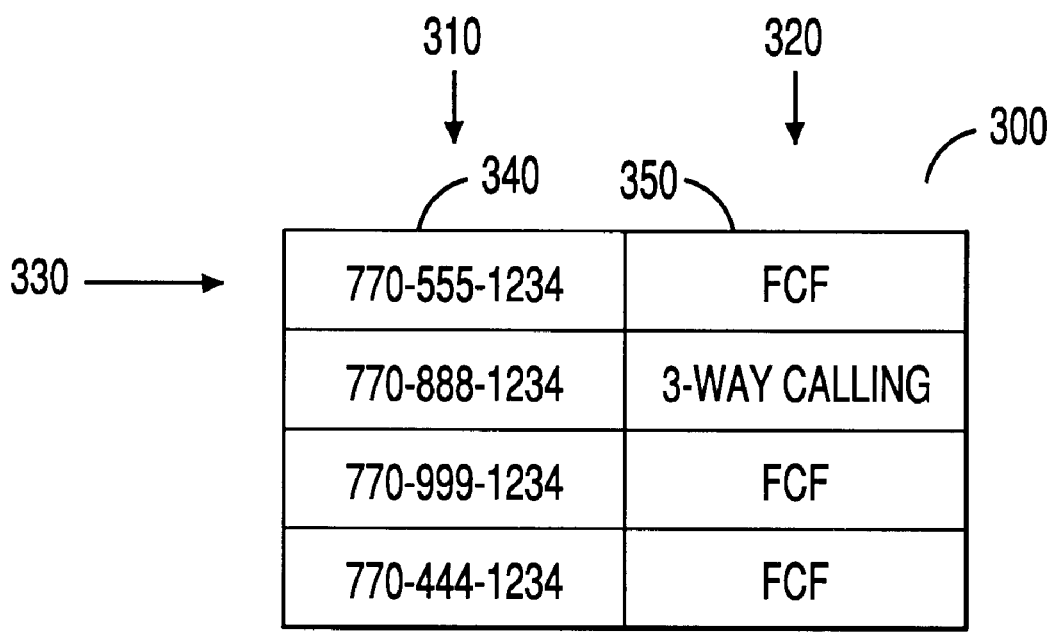
FIG. 3 is a block diagram of an exemplary seed database table 300, according to this invention.

This service request causes the SMS 135 to create an entry for the subscriber in the seed database 140. FIG. 3 is a block diagram of an exemplary seed database table 300, according to this invention As illustrated, the seed database record 300 includes two fields. The first field is a subscriber identifier field 310. The identifier may be a name of a subscriber. The identifier may also be the calling line of a subscriber. Other identifiers may be used as well. The second field is a service identifier field 320. The field 320 may include multiple entries indicating the various advanced telecommunications services ordered by the subscriber. For example, the service provider may use various codes to specify particular services. In FIG. 3, an entry for the subscriber is shown as entry 330 The subscriber's calling line number is specified in field 340 and a code for FCF is shown in field 350.

At this point, the SMS does not create an entry in the real-time application database 145 because the subscriber has not yet requested actual use of the service. Until the subscriber requests that his calls be forwarded to another number, he will remain an entry in the seed database 140. Thus, the use of the see database prevents the service provider from wasting limidted database space in the application database 140.

When the subscriber decides to use the FCF service, he dials a feature access code (e.g., "*77"). An exemplary embodiment provides for the use of *XX based on the provisioning of the appropriate SSPs with a Public Office Feature Code ("POFC") trigger. Referring to FIG. 2, the feature access code is received with the communication in the SSP 92a serving the subscriber's calling line 85a, and is recognized by the SSP 92a as an indicator of the special status of the communication. The special access code triggers the SSP 92a to pause in the processing of the call and to obtain further instructions from other network elements. Referring to the example, the subscriber's call to the feature access code is received in SSP 92a, which pauses in the processing of the communication to request instructions from SCP 100.

As part of the SSP's query to the SCP 100 for processing instructions, the SSP 92a provides the SCP 100 with information relating to the communication. This information may be provided in a TCAP message pursuant to the SS7 protocol. In particular, the SSP 92a provides the SCP 100 with communication information including the feature access code and the calling line number. In addition, the SSP 92a provides the SCP 100 with identification information. This identification information includes the calling party number or other identifier as appropriate.

In response to receiving the communication information and the identification information from the SSP 92a, the SCP 100 carries out certain functions. The SCP 100 looks up the meaning of the feature access code and this may be accomplished by looking up the code through use of an SPA. Upon look-up, the SCP 100 determines that the communication is an indication that the customer desires to use the FCF service. Based on this determination, the SCP 100 further determines that the communication is to be routed to the SCN 156. Thus, the SCP 100 provides a response with instructions to the SSP 92a to route the communication to the SCN 156.

Upon receipt of the processing instructions from the SCP 100, the SSP 92a routes the communication over voice links in a conventional manner to the SCN 156. The SCN 156 includes an interface 163 for providing an audio interaction, a dual tone multi-frequency ("DTMF") interaction with the caller. The interface may collect information from the subscriber regarding the service, including the desired forwarding number.

The SCN 156 provides the calling line and forwarding information to the FCF SPA 130. The FCF SPA 130 then searches the real-time database to locate an entry for the subscriber. The FCF SPA 130 may search the database using the calling line number of the subscriber. If an entry is found, the forwarding number may be stored in the real-time database together with other information that the FCF SPA 130 needs to carry out the service. If no entry is found, the FCF SPA 130 accesses the seed database.

Within the seed database, the FCF SPA 130 searches for the subscriber. The FCF SPA 130 may use the subscriber's directory number to locate the entry. Once the entry is located, the FCF SPA 130 creates a larger entry in the real-time database 145. This larger entry is used to implement the service. On subsequent uses by the subscriber, this entry will be located immediately by the FCF SPA 130 during the real-time database 145 search.

When the subscriber decides to suspend the service temporarily (as opposed to canceling FCF), he may dial the same feature access code or a different code. The call is forwarded to the SCP 100 by the SSP 92a, as discussed above. The SCP 100 instructs the call to be routed to the SCN 156 which plays a recorded message. The subscriber may then provide a number indicating that he wishes to terminate the service. The SCN 156 forwards this number back to the SCP 100 and back to the FCF SPA 130. The FCF SPA 130 will then remove the entry from the real-time FCF database 145.

Figure 4:
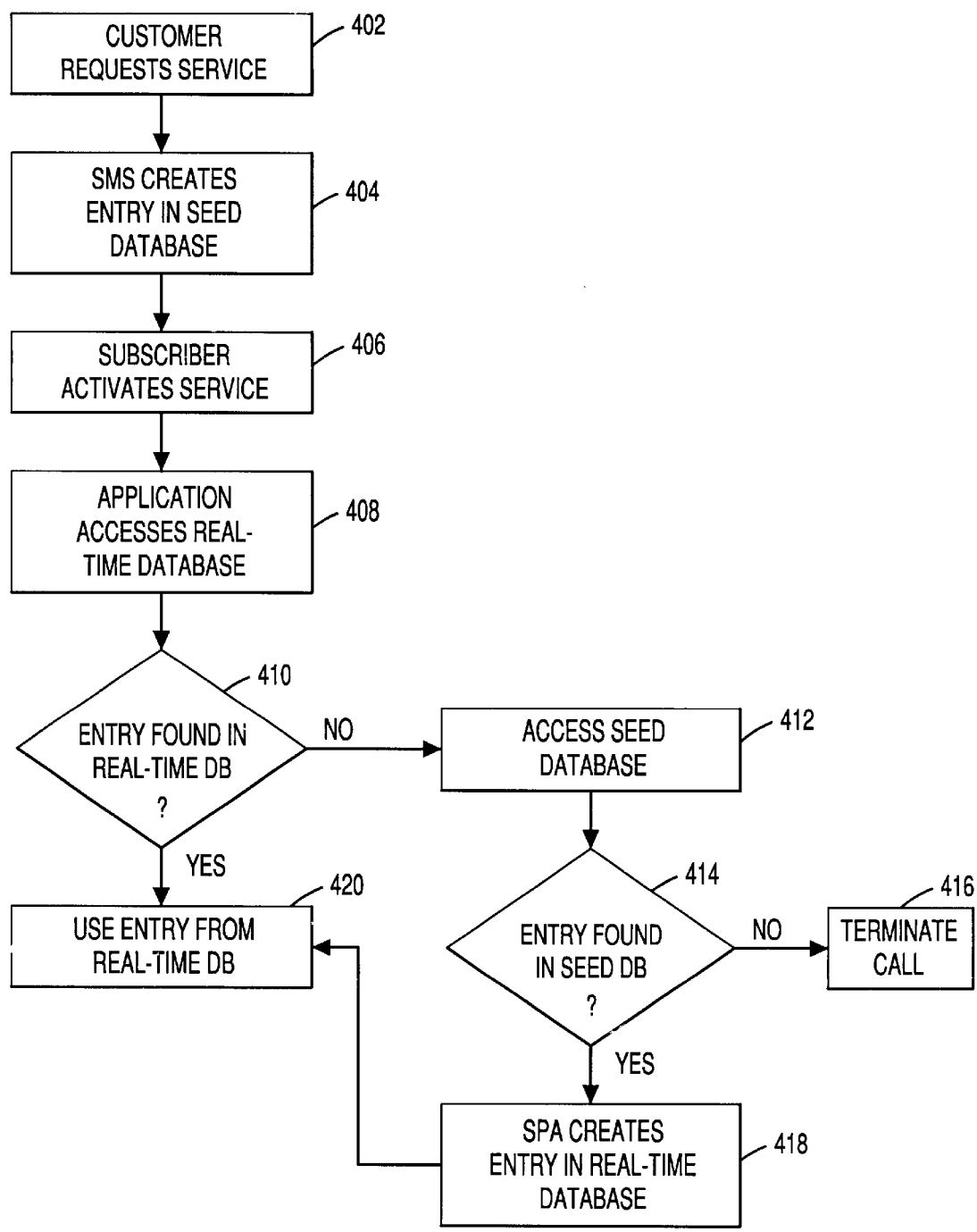
FIG. 4 is a flow chart indicating the steps that occur when a customer subscribes to and uses an advanced telecommunications service, according to this invention.

FIG. 4 is a flow chart indicating the steps that occur when a customer subscribes to and uses an advanced telecommunications service, according to this invention. In step 402, the customer dials a special access code (or phone number) to request the service. The SMS, in step 404, creates an entry in the seed database for the subscriber. The database entry includes an identifier for the subscriber and an identifier for the service. If the subscriber does not use the service, the seed database entry will be the only database entry for the subscriber in the network (aside from billing entries).

In step 406, the subscriber activates the service by, for example, dialing a feature access code. In step 408, the SPA for the service accesses the real-time database to determine whether the subscriber already has an entry for that service. If the subscriber has an entry (as indicated in the service identifier field of the seed database), the SPA uses the entry to implement the service in step 420. If the subscriber does not have an entry, the SPA, in step 412, accesses the seed database to determine whether the subscriber has privileges. If the subscriber has a seed database entry, the SPA creates an entry in the real-time database for the subscriber in step 418. On subsequent calls to the service, the SPA will immediately access the real-time database and find this entry. If the subscriber does not have privileges, the SPA terminates the call.

Having thus described a preferred embodiment of a method and system for minimizing database overhead in handling AIN services, it should be apparent to those skilled in the art that certain advantages have been achieved. It should also be appreciated that various modifications, adaptations, and alternative embodiments thereof, including the use of multiple seed and/or real-time databases, for example, may be made within the scope and spirit of the present invention. The invention is further defined by the following claims:

What is claimed is:

1. A system for using databases in providing telecommunications services to a subscriber in an intelligent network, the system comprising:
   a seed database storing information regarding a selection of services associated with the subscriber;
   a real-time application database storing information for use in providing a service to the subscriber with the real-time application database not storing specific information about the subscriber until the subscriber makes a use of the service; and
   a service application, resident on at least one computer in the network, that creates entries in the real-time application database using information from the seed database upon the use of the service by the subscriber.

2. The system for using databases, as recited in claim 1, further comprising a service management system that creates entries in the seed database when the subscriber subscribes to the service.

3. The system for using databases, as recited in claim 1, wherein the seed database is coupled to a service control point.

4. The system for using databases, as recited in claim 1, wherein the seed database includes an entry for the subscriber, each entry comprising:
   a subscriber identifier field storing information identifying the subscriber; and
   a service identifier field storing information identifying the service.

5. The system for using databases, as recited in claim 1, wherein the application may only read from the seed database.

6. The system for using databases, as recited in claim 1, further comprising a service circuit node operative to collect information from the subscriber relative to the service and further operative to provide the collected information to the service application.

7. The system for using databases, as recited in claim 6, wherein the service application, in response to receiving the collected information from the service circuit node, searches the real-time database to determine whether an entry exists for the subscriber.

8. In an advanced intelligent network, a method for using databases in providing telecommunications service to a subscriber to minimize database overhead, the method comprising:
   receiving a request for the service from the subscriber;
   in response to the request, storing information associating the subscriber and the service in a seed database;
   receiving a request to use the service from the subscriber;
   in response to the request to use the service, accessing a real-time database to determine whether an entry exists for the subscriber;
   in response to failing to find an entry for the subscriber in the real-time database, accessing the seed database to obtain the information regarding the subscriber;
   storing the information regarding the subscriber and information for use in providing the service to the subscriber in the real-time database.

9. The method for using databases, as recited in claim 8, wherein storing information regarding the subscriber and the service in a seed database further comprises:
   creating an entry in the seed database, the entry comprising:
      a subscriber identifier field storing information identifying the subscriber; and
      a service identifier field storing information identifying the service.

10. The method for using databases, as recited in claim 8, further comprising:
   collecting information from the subscriber regarding the service.

11. The method for using databases, as recited in claim 8, further comprising:
   receiving a request to cancel the service from the subscriber; and
   removing the information from the real-time database.

12. The method for using databases, as recited in claim 11, further comprising removing the information from the seed database.

13. The method for using databases, as recited in claim 8, wherein storing information in the seed database is performed by a service management system.

14. The method for using databases, as recited in claim 8, wherein storing information in the real-time database is performed by a service application that performs the requested service.

15. The method for using databases, as recited in claim 8, wherein accessing the seed database is performed by a service application that performs the requested service.

16. The method for using databases, as recited in claim 8, wherein the seed database may not be written to by a service application performing the requested service.

17. In an intelligent network, a system for providing a telecommunications service to a subscriber, the system comprising:
   an advanced intelligent network ("AIN") element;
   a seed database storing a selection of particular services associated with the subscriber;
   a real-time application database storing information for use in providing the service to the subscriber with the real-time application database not storing specific information about the subscriber until the subscriber makes a use of the service; and
   a service application, resident on at least one computer in the network, that creates entries in tile real-time application database upon use of the service by the subscriber.

18. With respect to a real-time database used in providing telecommunications services, a method of minimizing the number of entries in the real-time database yet having information available to the real-time database when needed for provision of a service to a user, comprising:
   in response to a user's subscription to a service, storing information about the user and the service in a seed database instead of the real-time database; and
   in response to a user's activation of the service, causing an application implementing the service to obtain the information from the seed database, and to create an entry with the information from the seed database in the real-time database, whereby the number of entries in the real-time database is minimized by the failure to create the entry in the real-time database in response to the user's subscription to the service and by the delay in creating the entry in the real-time database until the user's activation of the service.

19. The method of claim 18, wherein, prior to the application obtaining the information from the seed database, the application fails to find the entry with the information in the real-time database.

20. The method of claim 18, further comprising:

in response to de-activation of the service by the user, removing the entry with the information from the real-time database, but not removing the information from the seed database.

21. With respect to a real-time database used in providing telecommunications services, a system for minimizing the number of entries in the real-time database yet having information available to the real-time database when needed for provision of a service to a user, comprising:

seed database for storing information associating the user and the service in response to a user's subscription to the service; and an application operative to respond to a user's activation of the service by obtaining the information from the seed database and by creating an entry with the information from the seed database in the real-time database.

22. The system of claim 21, wherein, prior to the application obtaining the information from the seed database, the application fails to find the entry with the information in the real-time database.

23. The method of claim 21, wherein the application is responsive to de-activation of the service by the user by removing the entry with the information from the real-time database, but not removing the information from the seed database.

\* \* \* \* \*